United States Patent
Jung et al.

(10) Patent No.: US 9,235,746 B2
(45) Date of Patent: Jan. 12, 2016

(54) ELECTRONIC DEVICE INCLUDING FINGERPRINT IDENTIFICATION SENSOR, METHODS FOR PERFORMING USER AUTHENTICATION AND REGISTERING USER'S FINGERPRINT IN ELECTRONIC DEVICE INCLUDING FINGERPRINT IDENTIFICATION SENSOR, AND RECORDING MEDIUM RECORDING PROGRAM FOR EXECUTING THE METHODS

(71) Applicant: Samsung Electronics Co., Ltd., Suwon-si, Gyeonggi-do (KR)

(72) Inventors: Hansub Jung, Yongin-si (KR); Kyoungmo Kim, Seongnam-si (KR); Wansang Park, Seoul (KR); Yoonkyu Jang, Yongin-si (KR); Seongji Jang, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/493,899

(22) Filed: Sep. 23, 2014

(65) Prior Publication Data
US 2015/0086090 A1    Mar. 26, 2015

(30) Foreign Application Priority Data

Sep. 24, 2013   (KR) .......................... 10-2013-0113072

(51) Int. Cl.
G06K 9/00    (2006.01)

(52) U.S. Cl.
CPC ........ G06K 9/00013 (2013.01); G06K 9/00087 (2013.01)

(58) Field of Classification Search
None
See application file for complete search history.

(56) References Cited

U.S. PATENT DOCUMENTS

| | | | |
|---|---|---|---|
| 2004/0239648 A1* | 12/2004 | Abdallah et al. | 345/173 |
| 2005/0185828 A1* | 8/2005 | Semba et al. | 382/124 |
| 2005/0244038 A1* | 11/2005 | Benkley, III | 382/126 |
| 2008/0205714 A1* | 8/2008 | Benkley et al. | 382/126 |
| 2012/0127179 A1* | 5/2012 | Aspelin | 345/441 |
| 2013/0004032 A1 | 1/2013 | Abiko | |
| 2013/0159939 A1* | 6/2013 | Krishnamurthi | 715/863 |
| 2014/0341446 A1* | 11/2014 | Hare et al. | 382/124 |

* cited by examiner

*Primary Examiner* — Li Liu
(74) *Attorney, Agent, or Firm* — Jefferson IP Law, LLP

(57) ABSTRACT

A method for performing user authentication by using a fingerprint in an electronic device is provided. The method includes obtaining fingerprint image and fingerprint position information corresponding to an area of the user's finger, comparing the fingerprint image obtained by using fingerprint position information with a pre-registered fingerprint image corresponding to the position of the area to thereby perform the user authentication, and pairing the fingerprint image corresponding to the area of the user's finger with the fingerprint position information to be thereby stored in the memory.

22 Claims, 11 Drawing Sheets

ELECTRONIC DEVICE INCLUDING FINGERPRINT IDENTIFICATION SENSOR, METHODS FOR PERFORMING USER AUTHENTICATION AND REGISTERING USER'S FINGERPRINT IN ELECTRONIC DEVICE INCLUDING FINGERPRINT IDENTIFICATION SENSOR, AND RECORDING MEDIUM RECORDING PROGRAM FOR EXECUTING THE METHODS

CROSS-REFERENCE TO RELATED APPLICATION(S)

This application claims the benefit under 35 U.S.C. §119 (a) of a Korean patent application filed on Sep. 24, 2013 in the Korean Intellectual Property Office and assigned number 10-2013-0113072, the entire disclosure of which is hereby incorporated by reference.

TECHNICAL FIELD

The present disclosure relates to a method and a device for performing registration or authentication of a user by using a fingerprint identification sensor. More particularly, the present disclosure relates to a method for processing fingerprint images obtained through a fingerprint identification sensor in order to register or authenticate a user.

BACKGROUND

Recently, there is a growing trend of using user's fingerprints in order to perform user authentication. A fingerprint has merits in that it is always borne by the user, has no risk of being stolen or imitated, and is not changeable through the life. Fingerprint identification sensors that obtain fingerprint images may include optical fingerprint identification sensors and semiconductor-type fingerprint identification sensors.

Input of the user's fingerprint by using the fingerprint identification sensor may be implemented by a touch type and a swipe type. The touch type refers to a gesture in which the user touches the fingerprint identification sensor with the finger for a period of time. The swipe type refers to performing a swipe gesture using the finger on the fingerprint identification sensor. Here, the swipe gesture indicates that the user touches the fingerprint identification sensor and swipes in a specific direction.

The electronic device may obtain a fingerprint image corresponding to a certain area of the user's finger through the fingerprint identification sensor. Thereafter, the electronic device may compare the obtained fingerprint image with a pre-registered fingerprint image of the user. For example, the electronic device may compare feature information of the obtained fingerprint image with feature information of the preregistered fingerprint image. At this time, if the position of the area of the user's finger, which corresponds to the obtained fingerprint image, is different from the portion of the area of the user's finger, which corresponds to the pre-registered fingerprint image, both fingerprint images are not likely to match each other as a result of the comparison thereof.

Therefore, a need exists for a method for processing fingerprint images obtained through a fingerprint identification sensor in order to register or authenticate a user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the abovementioned problems and/or disadvantages and to provide at least the advantages described below. Accordingly, an aspect of the present disclosure is to provide a method for processing fingerprint images obtained through a fingerprint identification sensor in order to register or authenticate a user and for increasing the success rate of identification of the user fingerprint.

In accordance with an aspect of the present disclosure, a method for performing user authentication by using a fingerprint in an electronic device adopting a touch screen and a fingerprint identification sensor is provided. The method includes receiving an input of a swipe gesture on the touch screen and the fingerprint identification sensor, obtaining fingerprint position information from the touch screen and fingerprint image from the fingerprint identification sensor, respectively, according to the swipe gesture, determining the position of an area corresponding to the obtained fingerprint image on the user's finger, by using the fingerprint position information, comparing the obtained fingerprint image with a pre-registered fingerprint image corresponding to the position of the area, and performing the user authentication, as a result of the comparison of the pre-registered fingerprint image and the obtained fingerprint image.

Here, the fingerprint position information may be related to a touch position or a hovering position of the swipe gesture—the swipe gesture proceeds in the direction from the touch screen to the fingerprint identification sensor—on the touch screen.

In addition, the determining of the position of an area corresponding to the obtained fingerprint image on the user's finger, by using the obtained fingerprint position information may include determining the vertical position of the area corresponding to the fingerprint image on the user's finger, by considering a distance between the touch position or the hovering position of the swipe gesture on the touch screen and the fingerprint identification sensor.

Further, the determining of the position of an area corresponding to the obtained fingerprint image on the user's finger, by using the obtained fingerprint position information may include determining that the shorter the distance between the touch position or the hovering position of the swipe gesture on the touch screen and the fingerprint identification sensor is, the closer to the tip of the finger the position of an area corresponding to the obtained fingerprint image on the user's finger is.

Further, the determining of the position of an area corresponding to the obtained fingerprint image on the user's finger, by using the fingerprint position information may include determining the position of an area corresponding to the obtained fingerprint image on the user's finger, by considering a direction of the swipe gesture on the touch screen or a scanning position of the swipe gesture on the fingerprint identification sensor.

The comparing of the obtained fingerprint image with a pre-registered fingerprint image may include comparing feature information of the obtained fingerprint image with feature information of the pre-registered fingerprint image.

Further, the fingerprint identification sensor may be physically combined with a home button of the electronic device, and one side of the fingerprint identification sensor, which comes into contact with a user's finger to perform the swipe gesture, may be exposed on the home button of the electronic device.

In accordance with another aspect of the present disclosure, a method for registering a user's fingerprint in an electronic device adopting a touch screen and a fingerprint identification sensor is provided. The method includes receiving an input of a swipe gesture on the touch screen and the fingerprint identification sensor, obtaining fingerprint position information from the touch screen and fingerprint image from the fingerprint identification sensor, respectively, according to the swipe gesture, and pairing the obtained fingerprint image with the fingerprint position information to thereby store the same in a memory.

Here, the pairing the obtained fingerprint image and the fingerprint position information to thereby store the same in a memory may include: determining the position of an area corresponding to the obtained fingerprint image on a user's finger, by using the fingerprint position information, and pairing the obtained fingerprint image with the determined position of the area to thereby store the same in the memory.

In accordance with another aspect of the present disclosure, an electronic device is provided. The electronic device includes a touch screen, a fingerprint identification sensor configured to receive an input of a swipe gesture, a memory configured to store a pre-registered fingerprint image, and a processor configured to obtain fingerprint position information from the touch screen and fingerprint image from the fingerprint identification sensor, respectively, according to the swipe gesture, to determine the position of an area corresponding to the obtained fingerprint image on the user's finger, by using the fingerprint position information, to compare the obtained fingerprint image with the pre-registered fingerprint image corresponding to the position of the area, and to perform user authentication, as a result of the comparison of the pre-registered fingerprint image and the obtained fingerprint image.

Here, the fingerprint position information may be related to a touch position or a hovering position of the swipe gesture—the swipe gesture proceeds in the direction from the touch screen to the fingerprint identification sensor—on the touch screen.

Further, the processor, in determining the position of the area corresponding to the obtained fingerprint image on the user's finger, by using the obtained fingerprint position information, may determine the vertical position of the area corresponding to the fingerprint image on the user's finger, by considering a distance between the touch position or the hovering position of the swipe gesture on the touch screen and the fingerprint identification sensor.

Further, the processor, in determining the position of the area corresponding to the obtained fingerprint image on the user's finger, by using the obtained fingerprint position information, may determine that the shorter the distance between the touch position or the hovering position of the swipe gesture on the touch screen and the fingerprint identification sensor is, the closer to the tip of the finger the position of an area corresponding to the obtained fingerprint image on the user's finger is.

In addition, the processor, in determining the position of an area corresponding to the obtained fingerprint image on the user's finger, by using the fingerprint position information, may determine the position of an area corresponding to the obtained fingerprint image on the user's finger, by considering a direction of the swipe gesture on the touch screen or a scanning position of the swipe gesture on the fingerprint identification sensor.

Furthermore, the processor, in comparing the obtained fingerprint image with a pre-registered fingerprint image, may include feature information of the obtained fingerprint image with feature information of the pre-registered fingerprint image.

The fingerprint identification sensor may be physically combined with a home button of the electronic device, and one side of the fingerprint identification sensor, which comes into contact with a user's finger to perform the swipe gesture, may be exposed on the home button of the electronic device.

In accordance with another aspect of the present disclosure, an electronic device is provided. The electronic device includes a touch screen, a fingerprint identification sensor configured to receive an input of a swipe gesture, a memory configured to store a fingerprint image, and a processor configured to obtain fingerprint position information from the touch screen and fingerprint image from the fingerprint identification sensor, respectively, according to the swipe gesture, and to pair the obtained fingerprint image with the fingerprint position information to be thereby stored in the memory.

Here, the processor, in pairing the obtained fingerprint image and the fingerprint position information to be thereby stored in the memory, may determine the position of an area corresponding to the obtained fingerprint image on a user's finger, by using the fingerprint position information, and pair the obtained fingerprint image with the determined position of the area to thereby store the same in the memory.

In accordance with another aspect of the present disclosure, a recording medium that records a program for executing a method for performing user authentication by using a fingerprint is provided. The method includes receiving an input of a swipe gesture on the touch screen and the fingerprint identification sensor, obtaining fingerprint position information from the touch screen and fingerprint image from the fingerprint identification sensor, respectively, according to the swipe gesture, determining the position of an area corresponding to the obtained fingerprint image on the user's finger, by using the fingerprint position information, comparing the obtained fingerprint image with a pre-registered fingerprint image corresponding to the position of the area, and performing the user authentication, as a result of the comparison of the pre-registered fingerprint image and the obtained fingerprint image.

In accordance with another aspect of the present disclosure, a recording medium that records a program for executing a method for registering a user's fingerprint is provided. The method includes receiving an input of a swipe gesture on the touch screen and the fingerprint identification sensor, obtaining fingerprint position information from the touch screen and fingerprint image from the fingerprint identification sensor, respectively, according to the swipe gesture, and pairing the obtained fingerprint image with the fingerprint position information to thereby store the same in a memory.

According to various embodiments of the present disclosure, an area of the user's finger, which corresponds to the fingerprint image, is determined by using fingerprint position information, and the pre-registered fingerprint image corresponding to the position of the area is compared with the obtained fingerprint image, to thereby increase the success rate of identification of the user's fingerprint. In addition, the speed of identifying the fingerprint images may be improved by searching for the obtained fingerprint image and the pre-registered fingerprint image with fingerprint position information.

In addition, other effects obtained or expected by various embodiments of the present disclosure will be directly or implicitly disclosed in the detailed description of the various embodiments of the present disclosure. For example, various effects expected according to various embodiments of the present disclosure will be disclosed in the detailed description to be described later.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

In the accompanying drawings, some elements may be exaggerated, omitted, or schematically illustrated, and a size of each element may not precisely reflect the actual size thereof. Thus, the present disclosure is not limited by the relative size or interval drawn in the accompanying drawings.

Further, the singular form used in the present disclosure is intended to include the plural form unless clearly indicated in the context. Further, the term "and" used in the present specification should be understood as including any and all combinations of one or more of the associated listed items.

Further, the term "unit", "module", and the like, used in the present disclosure implies a unit for performing at least one function or operation, which can be implemented by hardware, software, or a combination of hardware and software.

Hereinafter, the present disclosure will be described with reference to the accompanying drawings.

Figure 1:
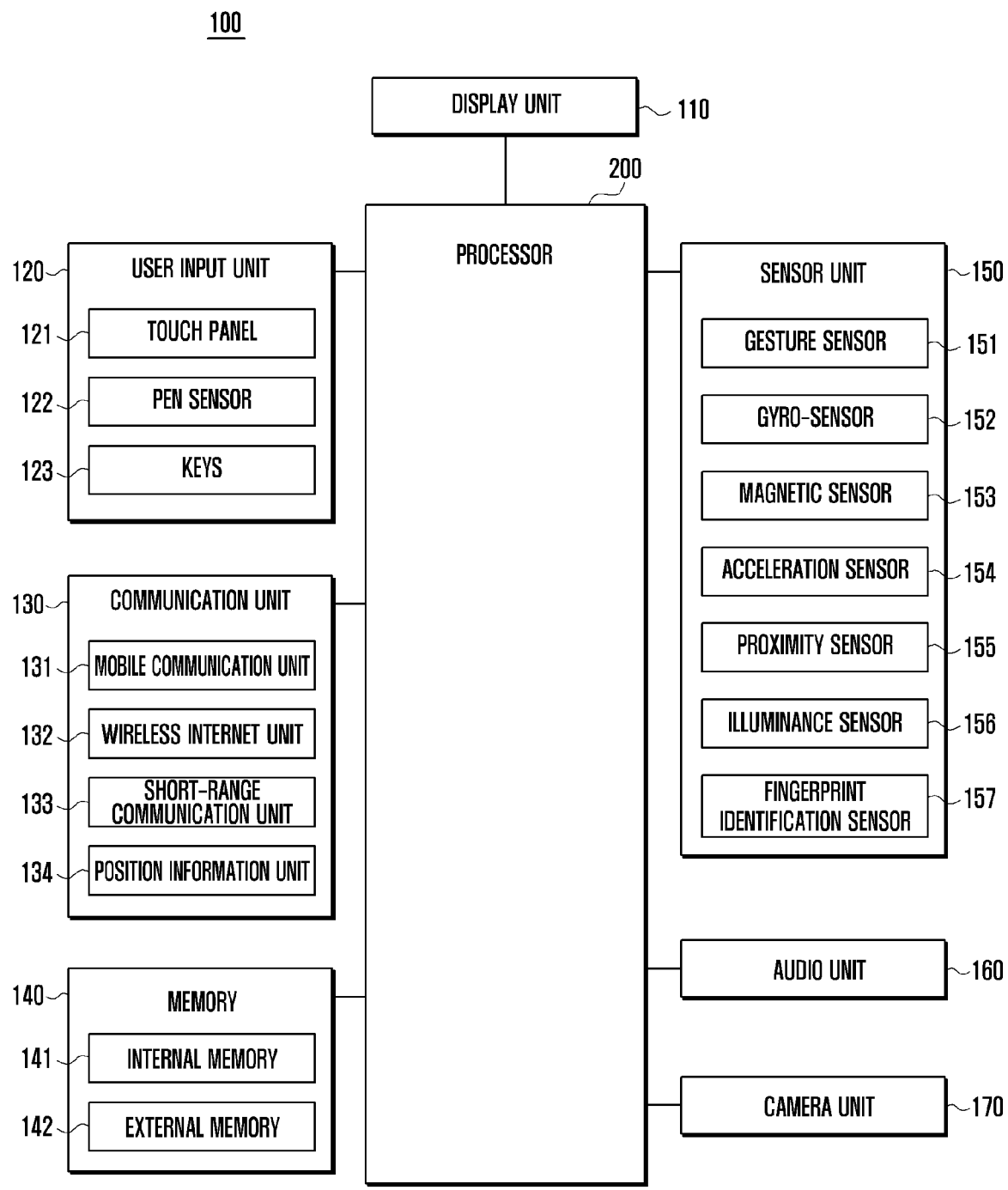
FIG. 1 is a block diagram illustrating a configuration of an electronic device according to an embodiment of the present disclosure.

FIG. 1 is a block diagram illustrating a configuration of an electronic device according to an embodiment of the present disclosure.

Referring to FIG. 1, the configuration of an electronic device 100 may be applied to smart phones, but it is not limited thereto, and may be applied to various devices. For example, the configuration of the electronic device 100 may be applied to desktop Personal Computers (PCs), laptop PCs, Portable Multimedia Players (PMPs), Personal Digital Assistants (PDAs), TVs, Digital Video Disc (DVD) players, electronic frames, washing machines, air conditioners, cleaners, refrigerators, various medical devices {e.g., a Magnetic Resonance Angiography (MRA), a Magnetic Resonance Imaging (MRI), a Computed Tomography (CT) machine, and an ultrasonic machine}, navigation devices, black boxes, set-top boxes, wrist watches, or wearable devices, such as Head-Mounted Displays (HMDs).

The electronic device 100 may include a display unit 110, a user input unit 120, a communication unit 130, a memory 140, a sensor unit 150, an audio unit 160, a camera unit 170, and a processor 200.

The display unit 110 may display images or data to the user. The display unit 110 may include a display panel. For example, Liquid Crystal Displays (LCDs) or Active-Matrix Organic Light Emitting Diodes (AMOLEDs) may be used for the display panel. At this time, the display unit 110 may include a controller for controlling the display panel. The display panel may be implemented to be, for example, flexible, transparent, or wearable.

The display unit 110 may be provided in the form of a touch screen 210 by being combined with a touch panel 121. For example, the touch screen 210 may be configured to be an integrated module by which the display panel and the touch panel are combined in a layered structure.

The user input unit 120 may receive inputs of various instructions from the user. The user input unit 120 may include at least one of, for example, the touch panel 121, a pen sensor 122, and keys 123.

The touch panel 121 may recognize the user's touch input by at least one of a capacitive type, a pressure type, an infrared type, or an ultrasonic type. In the case of the touch panel 121 of the capacitive type, the touch panel 121 may detect the change of the capacitance depending on the distance between the touch panel and the finger, and generate a touch event or a hovering event according to the amount of the change of the capacitance. At this time, the touch event may be generated at the time when the user's finger touches the touch screen. In addition, the hovering event may be generated at the time when the electronic device 100 detects the user's finger and the position of the user's finger on the touch screen is detected. The touch panel 121 may transfer touch position information or hovering position information according to the touch event or the hovering event to the processor 200.

The touch panel 121 may further include a tactile layer. In this case, the touch panel 121 may provide a tactile reaction to the user. The pen sensor 122 may be implemented, for example, by using a separate sheet for recognizing pens, as the same as the reception of the user's touch input. The keys 123 may include mechanical keys or touch keys. In the case of the mechanical keys which are provided on one side of the electronic device 100, the mechanical keys may include, for example, a power button for turning the screen on when pressed, and a volume button for adjusting the volume when pressed. In addition, in the case of the mechanical keys which are provided at the lower portion of the display unit 110 of the electronic device 100, the mechanical keys may include, for example, a home button that provides a home screen image when pressed. The touch keys may include, for example, at least one of a menu key that provides a menu related to contents displayed on the screen when touched, and a return key that provides a function of returning to the previous image when touched.

The communication unit 130 may include at least one of a mobile communication unit 131, a wireless Internet unit 132, a short-range communication unit 133, and a position information unit 134.

The mobile communication unit 131 transmits and receives wireless signals to and from at least one of base stations, external terminals, and servers through mobile communication networks. The wireless signals may include voice call signals, video call signals, or various data according to transmission and reception of text/multimedia messages.

The wireless Internet unit 132 performs a function for wireless Internet connection. The wireless Internet technologies may use Wireless LAN (WLAN), Wi-Fi, Wireless broadband (Wibro), World Interoperability for Microwave Access (Wimax), High Speed Downlink Packet Access (HSDPA), or the like.

The short-range communication unit 133 performs a function for shortrange communication. The short-range communication may utilize Bluetooth, Radio Frequency Identification (RFID), Infrared Data Association (IrDA), Ultra Wideband (UWB), ZigBee, or the like.

The position information unit 134 performs a function for obtaining or identifying the position of the mobile terminal. The position information unit 134 may obtain position information by using a Global Navigation Satellite System (GNSS). Here, the GNSS refers to a wireless navigation satellite system wherein satellites which have been placed into orbit around the Earth transmit reference signals to wireless navigation receivers in order to determine their location on the ground or above the ground. The GNSS includes the United States Global Positioning System (GPS), the European Union's Galileo positioning system, the Russian Global Orbiting Navigational Satellite System (GLONASS), the Chinese COMPASS, the Japanese Quasi-Zenith Satellite System (QZSS), and the like.

Additionally, the communication unit 130 may include network interfaces (e.g., LAN cards) or modems for connecting the electronic device 100 with networks {e.g., the Internet, a Local Area Network (LAN), a Wire Area Network (WAN), a Telecommunication Network, a Cellular Network, a Satellite Network, or a Plain Old Telephone Service (POTS)}.

The memory 140 may include at least one of an internal memory 141 and an external memory 142.

The internal memory 141 may include at least one of a volatile memory {e.g., a dynamic RAM (DRAM), a static RAM (SRAM), a synchronous RAM (SDRAM), and the like} or a non-volatile memory {e.g., an one time programmable ROM (OTPROM), a programmable ROM (PROM), an erasable and programmable ROM (EPROM), an electrically erasable and programmable ROM (EEPROM), a mask ROM, a flash ROM, and the like}, a Hard Disc Drive (HDD), a Solid State Drive (SSD), or the like. According to an embodiment of the present disclosure, the processor 200 may load instructions or data received from at least one of the non-volatile memory or other elements to the volatile memory to be thereby processed. In addition, the processor 200 may preserve the data received from the other elements or generated data in the non-volatile memory.

The external memory 142 may include, for example, a Compact Flash (CF), a Secure Digital (SD), a Micro-SD, a Mini-SD, an extreme Digital (xD), or a memory stick.

The memory 140 may store an operating system that controls resources of the electronic device and application programs for operations of applications. The operating system may include a kernel, a middleware, and an API. For example, Android, iOS, Windows, Symbian, Tizen, Bada, or the like may be used for the operating system.

The kernel may include a system resource manager for controlling resources and a device driver. The system resource manager may include, for example, a process managing unit, a memory managing unit, a file system managing unit, and the like, and perform a control, allocation, or collection of system resources. The device driver may access and control various elements of the electronic device 100 in terms of software. In order to do so, the device driver may be divided into, for example, interfaces and each driver module which is provided by hardware suppliers. For example, the device driver may include at least one of a display driver, a camera driver, a Bluetooth driver, a common memory driver, a USB driver, a keypad driver, a Wi-Fi driver, an audio driver, Inter-Process Communication (IPC) driver, and the like.

The middleware may be configured to include a plurality of modules which are pre-composed to provide common functions used for various applications. The middleware may provide common functions through the API in order to effectively use limited system resources inside the electronic device for the applications. The middle ware may include at least one of, for example, an application manager, a window manager, a multimedia manager, a resource manager, a power manager, a database manager, a package manager, or the like.

In addition, according to an embodiment of the present disclosure, the middleware may include at least one of a connectivity manager, a notification manager, a location manager, a graphic manager, or a security manager.

Further, according to an embodiment of the present disclosure, the middleware may include a run-time library or other library modules. The run-time library is a library module used by a compiler in order to add new functions through a programming language during execution of applications. For example, the rum-time library may perform functions of an input/output, the management of memories, or calculation of a formula. The middleware may be combined with various functions of the above-described internal element modules into a new middleware to be used. Meanwhile, the middleware may provide modules which are specialized according to the types of operating systems in order to provide differentiated functions.

The API, that is a group of API programming functions, may be provided in a different configuration according to operating systems. For example, in the case of Android or iOS, for example, a single API set may be provided to each of the flatforms. In the case of Tizen, for example, two or more API sets may be provided.

The applications may perform at least one function by using application programs. The applications may be divided into, for example, preloaded applications or third party applications. The applications may include a home application for returning to a home image, a dialer application, a Short Message Server (SMS)/multiMedia Message Service (MMS) application, an Instant Message (IM) application, a browser application, a camera application, an alarm application, a contact application, a voice dial application, an e-mail application, a calendar application, a media player application, an album application, or a clock application.

The sensor unit 150 may include, for example, a gesture sensor 151, a gyro-sensor 152, a magnetic sensor 153, an acceleration sensor 154, a proximity sensor 155, an illuminance sensor 156, or a fingerprint identification sensor 157.

The fingerprint identification sensor 157 may be an image input device for obtaining fingerprint images (or image information of the fingerprint images) which are different from users. The detected data of the fingerprints may be obtained by various sensors, such as an optical type sensor, a semiconductor type sensor, an ultrasonic type sensor, a non-contact type sensor, and the like.

An optical type fingerprint identification sensor may include, for example, a prism, a light source, lenses, or a Charge-Coupled Device (CCD). In the optical sensor, when the fingerprint contacts the prism, the light source illuminates the prism. In addition, the lenses collect the light reflected through the prism, and the CCD may obtain the fingerprint image from the collected light.

The semiconductor type fingerprint identification sensor may include a thermal sensor, a capacitive sensor, an electric sensor, and the like. The semiconductor type fingerprint identification sensor may be minimized in its size, so it may be widely used in personal application products. The thermal sensor may obtain the fingerprint image from the temperature distribution due to the difference of temperatures between the contact portion of the finger and the non-contact portion thereof. The capacitive sensor may obtain the fingerprint image from the difference of the amount of electrical charge or capacitance between ridges of the fingerprint contacting the sensor. The electrical sensor may obtain fingerprint image information from the electrical field formed on or around the fingerprint which contacts the sensor.

Meanwhile, the fingerprint identification sensor 157 may include at least a portion of the processor 200. For example, the fingerprint identification sensor 157 may perform the operations of correcting the fingerprint image or computing the features of the fingerprint image as well as obtaining the fingerprint image. In this case, the fingerprint identification sensor 157 may be a functional module that has a hardware module and a software module.

The fingerprint identification sensor 157 may be mounted on one side of the housing of the electronic device 100. In addition, the fingerprint identification sensor 157 may be combined with the keys 123 of the electronic device 100. For example, the fingerprint identification sensor 157 may be physically combined with the home button that is one of the keys 123 of the electronic device 100. In this case, one side of the fingerprint identification sensor 157, which the user's finger contacts, may be exposed on the home button.

The fingerprint identification sensor may be mounted on the electronic device 100 in various ways, considering a user's behavior and manipulative convenience.

The names of the above-described elements of the electronic device 100 may vary. In addition, the electronic device 100 according to the present disclosure may include at least one of the above-described elements. Further, some of the elements may be omitted, or other elements may be added.

The audio unit 160 may transform voices to electrical signals, and vice versa. The audio unit 160 may include at least one of, for example, a speaker, a receiver, an earphone, or a microphone, to thereby transform input or output voice information.

The camera unit 170 may perform a function of taking pictures and movies. The camera unit 170 may include at least one image sensor (e.g., front lenses or rear lenses) (not shown), an Image Signal Processor (ISP) (not shown), or a flash LED (not shown), according to an embodiment of the present disclosure.

The processor 200 may control a multitude of elements of hardware and software linked to the processor 200 by executing the operating system and application programs, and process and calculate various data including multimedia data. For example, the processor 200 may obtain the fingerprint image and the fingerprint position information corresponding to a specific area of the finger, and determine the position of the specific area of the finger corresponding to the obtained fingerprint image by using the fingerprint position information. Further, the processor 200 may compare the obtained fingerprint image with a pre-registered fingerprint image corresponding to the obtained position of the specific area, to thereby perform the user authentication. The processor 200 may be implemented by, for example, a System on Chip (SoC), and further include a Graphic Processing Unit (GPU).

Figure 2:
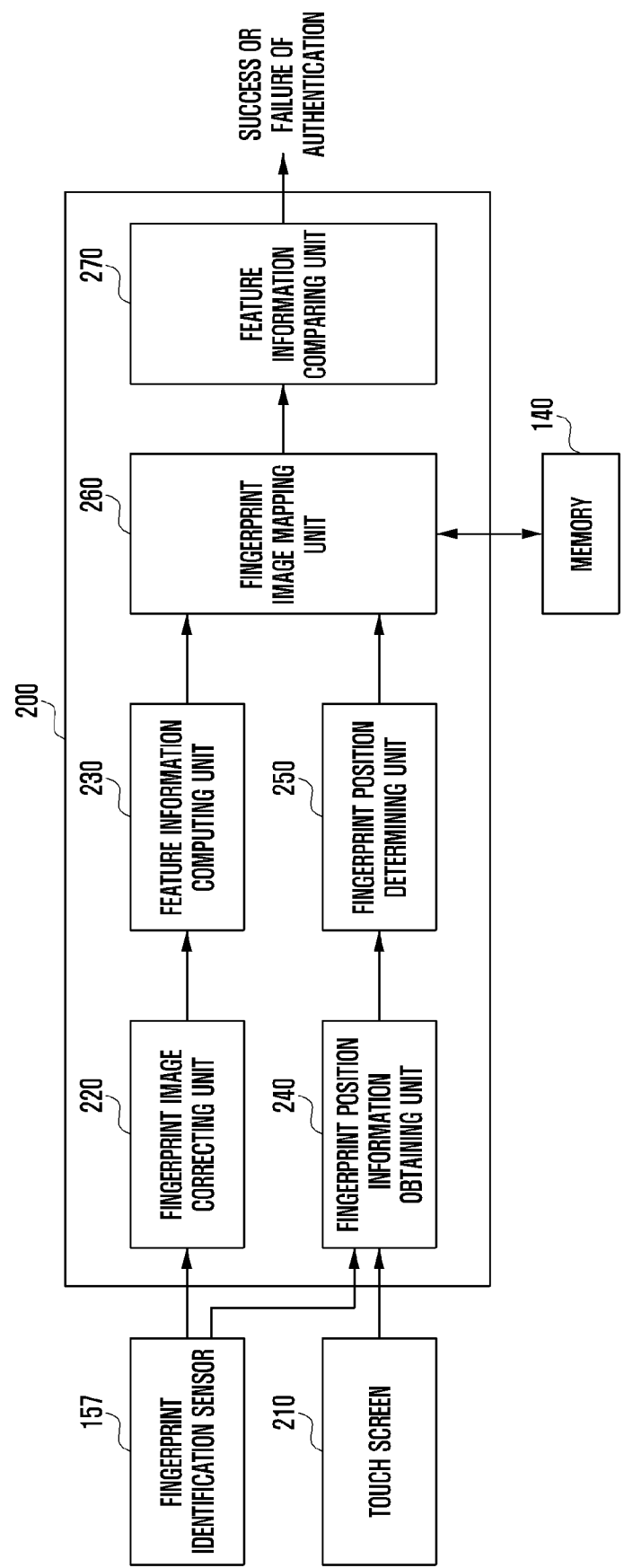
FIG. 2 is a block diagram illustrating a configuration of a processor of an electronic device according to an embodiment of the present disclosure.

FIG. 2 is a block diagram illustrating a configuration of a processor of an electronic device according to an embodiment of the present disclosure.

Referring to FIG. 2, the processor 200 may include a fingerprint image correcting unit 220, a feature information computing unit 230, a fingerprint position information obtaining unit 240, a fingerprint position determining unit 250, a fingerprint image mapping unit 260, and a feature information comparing unit 270. Here, the modules 220, 230, 240, 250, 260 and 270 of the processor are configured for the convenience of description, and the modules 220, 230, 240, 250, 260 and 270 may be variously modified by omitting, changing or combining some thereof. In addition, the modules 220, 230, 240, 250, 260 and 270 may be implemented by hardware or software, or a combination thereof.

The modules of the processor 200 may perform operations of registering and authenticating users by using the user's fingerprint.

The fingerprint image correcting unit 220 of the processor 200 may obtain the fingerprint image from the fingerprint identification sensor 157. The fingerprint identification sensor 157 may generate the fingerprint image corresponding to a specific area of the user's finger, for example, according to the swipe gesture of the user using his or her finger on the fingerprint identification sensor 157. The fingerprint image correcting unit 220 may obtain the fingerprint image corresponding to the specific area of the user's finger from the fingerprint identification sensor 157. The size of the fingerprint image may be, for example, 120 pixels×400 pixels in horizontal and vertical lengths. Provided that the display unit 110 has a size of 5 inches, and the numbers of horizontal and vertical pixels of the display unit 110 are 1080 pixels×1920 pixels, the horizontal and vertical size of the fingerprint image may be about 10 mm×20 mm.

The fingerprint image correcting unit 220 may correct the obtained fingerprint image. For example, if the fingerprint image has a distorted shape or a low definition area, the fingerprint image correcting unit 220 may process the image by using statistical data or an image processing function, to thereby correct or restore the distorted shape or the low definition area. The fingerprint image correcting unit 220 may provide the corrected fingerprint image to the feature information computing unit 230.

Meanwhile, the fingerprint image correcting unit 220 may be omitted. In this case, the fingerprint image obtained from the fingerprint identification sensor 157 may be provided to the feature information computing unit 230 without the process of the image.

The feature information computing unit 230 may compute feature information of the fingerprint image based on the corrected fingerprint image. The feature information of the fingerprint image may be minutiae showing at least one feature point. The minutiae may include feature points showing a bifurcation point, an end point, a core, and a delta. In addition, the minutiae may include feature points showing directions or shapes of ridges and valleys between the ridges. The feature information may be computed in the form of, for example, a feature information template that is an information form of a format (or a frame). The feature information computing unit 230 may provide the feature information of the fingerprint image on each position to the fingerprint image mapping unit 260.

Figure 3:
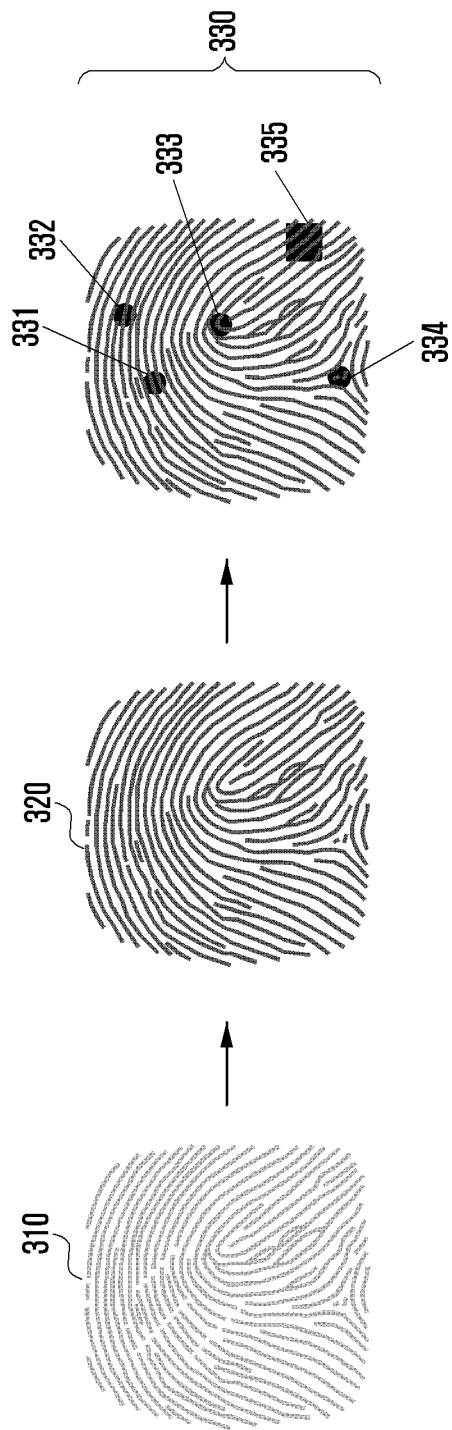
FIG. 3 illustrates a method of computing feature information of a fingerprint image by a processor according to an embodiment of the present disclosure.

FIG. 3 illustrates a method of computing feature information of a fingerprint image by a processor according to an embodiment of the present disclosure.

Referring to FIG. 3, the fingerprint identification sensor 157 may generate a fingerprint image 310 according to the user's gesture. Thereafter, the generated fingerprint image 310 may be provided to the fingerprint image correcting unit 220.

The fingerprint image correcting unit 220 may correct the generated fingerprint image 310 generated by the fingerprint identification sensor 157, to thereby generate a corrected fingerprint image 320. The corrected fingerprint image 320 may have a higher definition than the fingerprint image 310, or a corrected shape. The fingerprint image correcting unit 220 may provide the corrected fingerprint image 320 to the feature information computing unit 230.

The feature information computing unit 230 may compute feature information 330, based on the corrected fingerprint image. The feature information may be minutiae showing at least one feature point. The minutiae may include a bifurcation point 331, an end point 332, a core 333, and a delta 334. In addition, the minutiae may include feature points showing directions or shapes of ridges and valleys 335 between the ridges.

Returning to FIG. 2, the fingerprint position information obtaining unit 240 of the processor 200 may obtain fingerprint position information from the touch screen 210 or the fingerprint identification sensor 157.

If the obtained fingerprint image from the fingerprint identification sensor 157 corresponds to a specific area of the user's finger, the fingerprint position information may be the information related to the position of the specific area of the user's finger.

For example, when the user performs the swipe gesture on the fingerprint identification sensor 157 in order to input fingerprint, the user's touch for the swipe gesture may concurrently or almost concurrently occur on the touch screen 210 and the fingerprint identification sensor 157. In this case, a touch event for recognizing the user's touch may occur on the touch screen 210, and a scanning event for recognizing the user's fingerprint may occur on the fingerprint identification sensor 157, respectively.

Upon the occurrence of the touch event on the touch screen 210, the fingerprint position information obtaining unit 240 may obtain touch position information or hovering position information from the touch screen 210. The touch position information may be the position where the touch, for example, due to the swipe gesture starts on the touch screen 210. The hovering position information may be the position where the user's finger begins to be recognized on the touch screen 210 according to, for example, the swipe gesture.

Upon the occurrence of the scanning event on the fingerprint identification sensor 157, the fingerprint position information obtaining unit 240 may obtain scanning position information from the fingerprint identification sensor 157. The scanning position information may be the position where the scanning of the user's fingerprint starts on the fingerprint identification sensor 157 according to, for example, the swipe gesture. Alternatively, the fingerprint position information obtaining unit 240 may determine that the middle point of the fingerprint identification sensor 157 is the position where the scanning starts. For example, in the case of the fingerprint identification sensor 157 which is physically combined with the button of the electronic device 100, the position where the scanning starts may be the middle point of the button.

The fingerprint position determining unit 250 may obtain the fingerprint position information from the fingerprint position information obtaining unit 240, and determine the position of the specific area of the user's finger corresponding to the fingerprint image obtained from the fingerprint identification sensor 157 by using the fingerprint position information. For example, the fingerprint position determining unit 250 may obtain the fingerprint position information, such as touch position information, hovering position information, scanning position information, and the like. In this case, for example, the touch position or the hovering position may be the middle point of the first knuckle of the finger, and the scanning position may be a starting point of the fingerprint image. The fingerprint position determining unit 250 may determine the position of the specific area of the user's finger, which corresponds to the fingerprint image by using distances between the above pieces of fingerprint position information.

Figure 4:
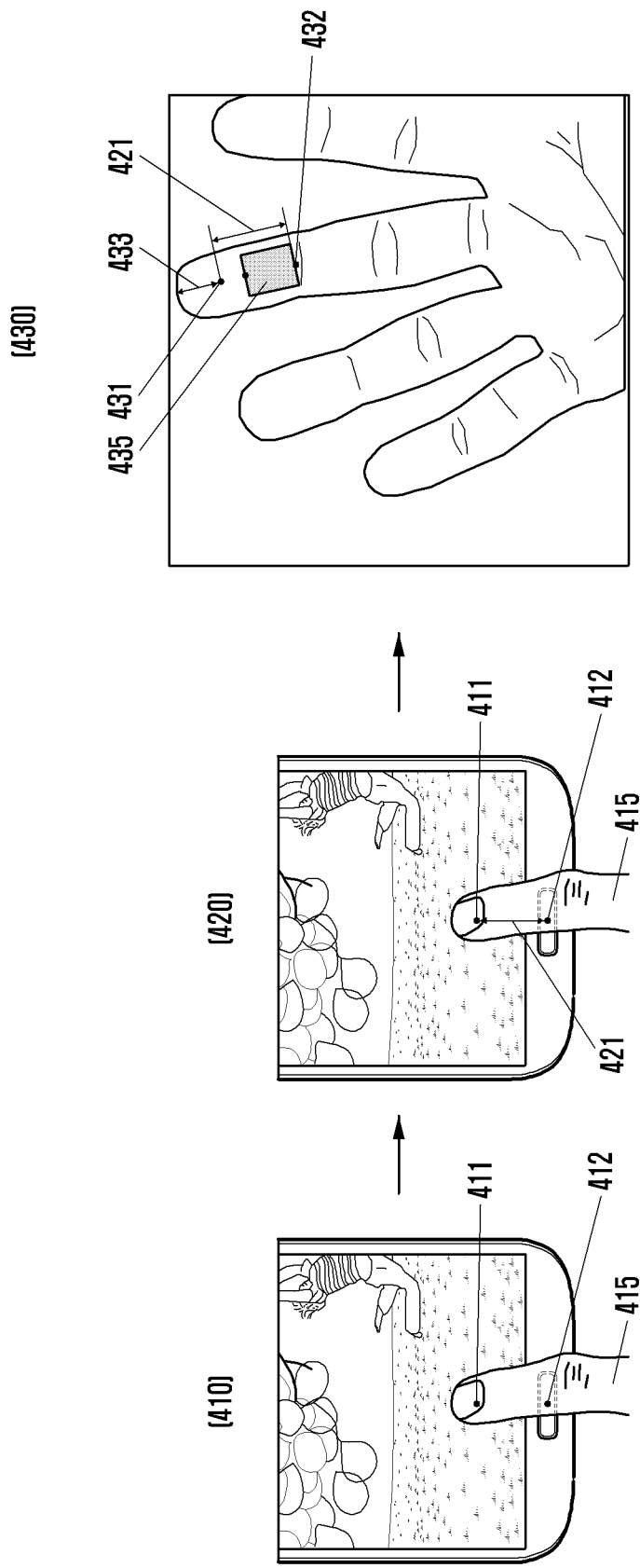
FIG. 4 illustrates a method of determining a specific area of a user's finger corresponding to a fingerprint image according to an embodiment of the present disclosure.

FIG. 4 illustrates a method of determining a specific area of a user's finger, which corresponds to a fingerprint image according to an embodiment of the present disclosure.

Referring to diagram 410 of FIG. 4, when the user performs a swipe gesture 415 on the fingerprint identification sensor 157 in order to input his or her fingerprint, the fingerprint position information obtaining unit 240 may obtain touch position information on a touch position 411 due to the occurrence of the touch event from the touch screen 210, and concurrently or almost concurrently obtain scanning position information on a scanning position 412 due to the occurrence of the scanning event from the fingerprint identification sensor 157.

Referring to diagram 420 of FIG. 4, the fingerprint position determining unit 250 may determine a distance 421 between the touch position 411 and the scanning position 412 based on at least one piece of the touch position information and the scanning position information. At this time, the distance 421 refers to a straight line from the touch position 411 to the scanning position 412, and the vertical length of the fingerprint image on the user's finger, which is obtained from the fingerprint identification sensor 157, may be determined based on the distance 421.

Referring to diagram 430 of FIG. 4, the touch position 411 on the touch screen 210 may corresponds to a first point 431 that is located on the middle point of the first knuckle of the user's finger, and the scanning position 412 on the fingerprint identification sensor 157 may corresponds to a second point 432 of the user's finger. At this time, the first point 431 may be spaced a certain distance 433 apart from the tip of the finger. For an example, the first point 431 may be spaced apart from the tip of the finger by the distance 433 of 10 mm. In another example, the certain distance 433 may be obtained from statistics by considering gender and age of people. For example, a plurality of distances may be stored in the memory 140 depending on gender and age of people, and one of the distances may be the certain distance 433 by asking for information about the gender or age of the user. The certain distance 433 may vary with the distance between the touch position and the scanning position. For example, if the distance between the touch position 411 and the scanning position 412 is too short, it may be regarded that the user lifts his or her finger, and then the first point 431 may be positioned at the upper position rather than the middle point of the first knuckle of the user's finger. At this time, the certain distance 433 from the tip of the finger may be shorter than 10 mm. On the contrary, if the distance between the touch position and the scanning position is too long, it may be regarded that the user lays his or her finger, and then the first point 431 may be positioned at the lower position rather than the middle point of the first knuckle of the user's finger. At this time, the certain distance 433 from the tip of the finger may be longer than 10 mm.

Returning to diagram 430 of FIG. 4, the vertical position of an area 435 corresponding to the fingerprint image on the finger may be determined by considering the distance between the first point 431 and the second point 432. For example, provided that the distance from the tip of the finger to the first point 431 is 10 mm, the distance 421 between the first point 431 and the second point 432 is 30 mm, and the horizontal size of the fingerprint image that is scanned by the fingerprint identification sensor 157 is 20 mm, the vertical position of the area 435 corresponding to the fingerprint image on the finger may be in the range of 20 mm to 40 mm from the tip of the finger.

Figure 5:
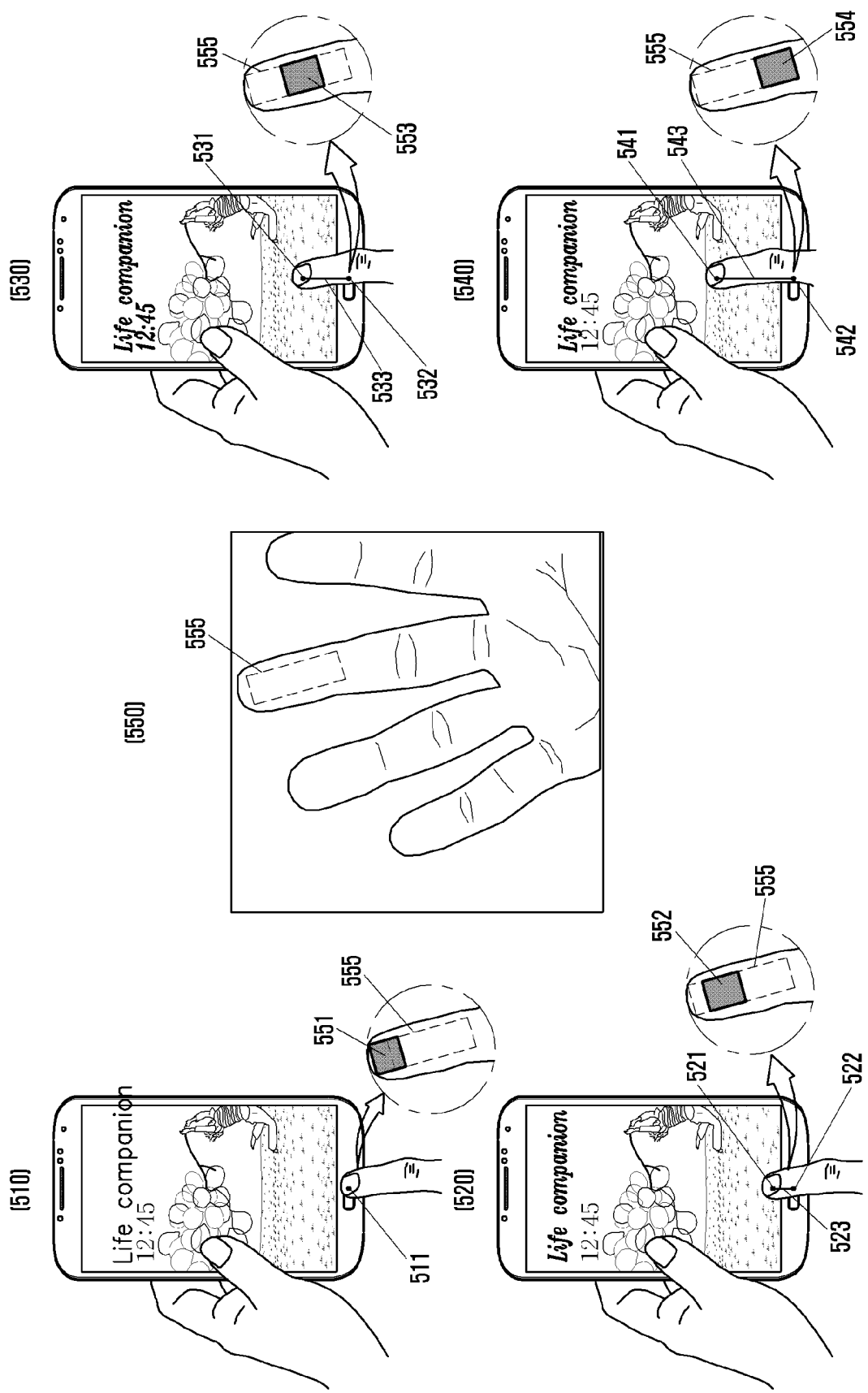
FIG. 5 illustrates positions of specific areas corresponding to a fingerprint image depending on positions of swipe gestures according to an embodiment of the present disclosure.

FIG. 5 illustrates positions of specific areas corresponding to a fingerprint image depending on positions of swipe gestures according to an embodiment of the present disclosure.

Referring to diagram 510 of FIG. 5, when the user does not touch the touch screen 210, and just places the tip of the finger on the fingerprint identification sensor 157, the fingerprint position information obtaining unit 240 may obtain scanning position information on a scanning position 511. In this case, the fingerprint position determining unit 250 may determine that the tip of the user's finger is scanned by the fingerprint identification sensor 157. Since the tip of the finger is scanned through the fingerprint identification sensor 157, the vertical length of the fingerprint image may be measured to be less than the reference size of 20 mm. For example, the vertical position of the area corresponding to the fingerprint image on the finger may have the range from the tip of the finger to 10 mm. The position may correspond to a first area 551 of a portion 555 of the finger in diagram 550 of FIG. 5.

Referring to diagram 520 of FIG. 5, the fingerprint position information obtaining unit 240 may obtain both touch position information on a touch position 521 and scanning position information on a scanning position 522 according to the user's swipe gesture on the fingerprint identification sensor 157. The fingerprint position determining unit 250 may determine the vertical position of the area corresponding to the fingerprint image on the finger by considering a distance 523 between the touch position 521 and the scanning position 522. For example, the vertical position may be in the range from 10 mm (the middle point of the first knuckle of the finger) to 30 mm from the tip of the finger. The position may correspond to a second area 552 of the portion 555 of the finger in diagram 550 of FIG. 5.

Referring to diagram 530 of FIG. 5, the fingerprint position information obtaining unit 240 may obtain both touch position information on a touch position 531 and scanning position information on a scanning position 532 according to the user's swipe gesture on the fingerprint identification sensor 157. The fingerprint position determining unit 250 may determine the vertical position of the area corresponding to the fingerprint image on the finger by considering a distance 533 between the touch position 531 and the scanning position 532. At this time, since the user maintains the swipe gesture for a time longer than that in diagram 520 of FIG. 5, the distance 533 between the touch position 531 and the scanning position 532 may be longer than the distance 523 calculated in diagram 520 of FIG. 5. The fingerprint position determining unit 250 may determine that the vertical position of the area corresponding to the fingerprint image is in the range from 30 mm to 50 mm from the tip of the finger. The position may correspond to a third area 553 of the portion 555 of the finger in diagram 550 of FIG. 5.

Referring to diagram 540 of FIG. 5, the fingerprint position information obtaining unit 240 may obtain both touch position information on at least one touch position 541 and scanning position information on a scanning position 542 according to the user's swipe gesture on the fingerprint identification sensor 157. The fingerprint position determining unit 250 may determine the vertical position of the area corresponding to the fingerprint image on the finger by considering a distance 543 between the touch position 541 and the scanning position 542. At this time, since the user maintains the swipe gesture for a time longer than that in diagram 530 of FIG. 5, the distance between the touch position 541 and the scanning position 542 may be longer than the distance 533 calculated in diagram 530 of FIG. 5. The fingerprint position determining unit 250 may determine that the vertical position of the area corresponding to the fingerprint image is in the range from 50 mm to 70 mm from the tip of the finger. The position may correspond to a fourth area 554 of the portion 555 of the finger in diagram 550 of FIG. 5.

According to diagrams 510 to 540, as the touch position where the touch of the swipe gesture starts on the touch screen 210 and the scanning position where the scanning starts on the fingerprint identification sensor 157 are close to each other, the vertical position of the area corresponding to the fingerprint image on the user's finger may be close to the tip of the finger.

Figure 6:
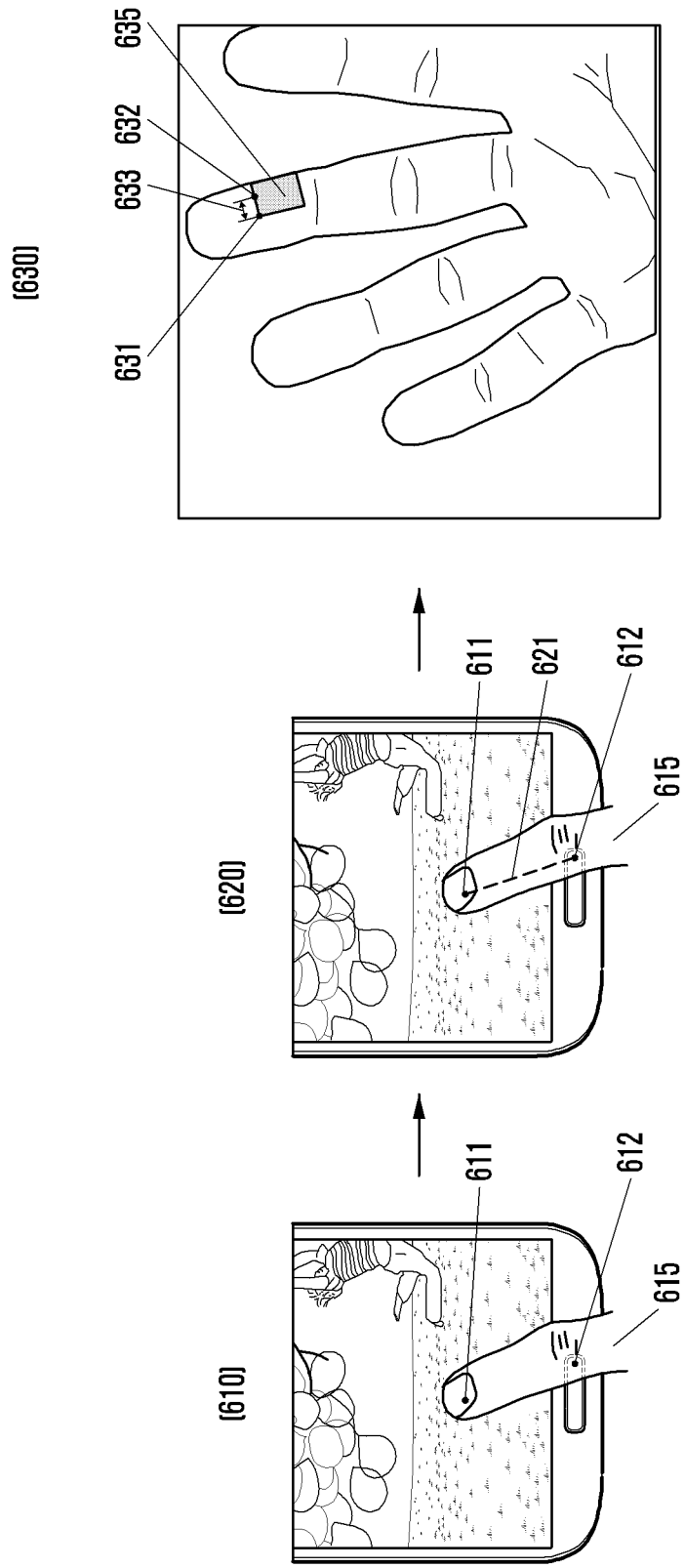
FIG. 6 illustrates a method of determining a position of a specific area of a user's finger corresponding to a fingerprint image according to an embodiment of the present disclosure.

FIG. 6 illustrates a method of determining a position of a specific area of a user's finger, which corresponds to a fingerprint image according to an embodiment of the present disclosure.

Referring to diagram 610 of FIG. 6, when the user performs a swipe gesture 615 on the fingerprint identification sensor 157 in order to input his or her fingerprint, the fingerprint position information obtaining unit 240 may obtain touch position information on at least one touch position 611 due to the occurrence of the touch event from the touch screen 210, and concurrently or almost concurrently obtain scanning position information on a scanning position 612 due to the occurrence of the scanning event from the fingerprint identification sensor 157.

Referring to diagram 620 of FIG. 6, the fingerprint position determining unit 250 may determine the direction of the swipe gesture 615 on the fingerprint identification sensor 157, based on at least one of the touch position information and the scanning position information. For example, if a line 621 from the touch position 611 to the scanning position 612 due to the swipe gesture 615 is oriented right with respect to the center of the fingerprint identification sensor 157, the fingerprint position determining unit 250 may determine that the swipe gesture 615 is performed on the right side on the fingerprint identification sensor 157. On the contrary, if the line from the touch position to the scanning position line due to the swipe gesture 615 is oriented left with respect to the center of the fingerprint identification sensor 157, the fingerprint position determining unit 250 may determine that the swipe gesture 615 is performed on the left side on the fingerprint identification sensor 157. The fingerprint position determining unit 250 may determine a horizontal distance 633 of the fingerprint image obtained from the fingerprint identification sensor 157 on the user's finger by considering the degree of the orientation of the swipe gesture 615 from the center of the fingerprint identification sensor 157 to the right or the left.

Meanwhile, in the case of the fingerprint identification sensor 157 that can recognize an area where the user's fingerprint is scanned from an area where the user's fingerprint is not scanned, the fingerprint position determining unit 250 may determine the horizontal distance 633 of the fingerprint image obtained from the fingerprint identification sensor 157 on the user's finger by considering whether the scanned area is positioned on the right side or on the left side on the fingerprint identification sensor 157.

Referring to diagram 630 of FIG. 6, a first point 631 may be positioned on the vertical center line of the user's finger, and a second point 632 corresponding to a middle point of the area 635 corresponding to the fingerprint image may be spaced a certain distance apart to the right or left from the vertical center line of the finger. In this case, the horizontal position of the area 635 corresponding to the fingerprint image may be determined by considering the distance between the first point 631 and the second point 632. For example, provided that the distance between the first point 631 and the second point 632 is about 5 mm, the user's fingerprint is positioned toward the right side on the fingerprint identification sensor 157, and the horizontal size of the scanned fingerprint image is 10 mm, the horizontal position of the area corresponding to the fingerprint image on the user's finger may be in the range of 0 mm to 10 mm to the right from the vertical center line of the finger.

Figure 7:
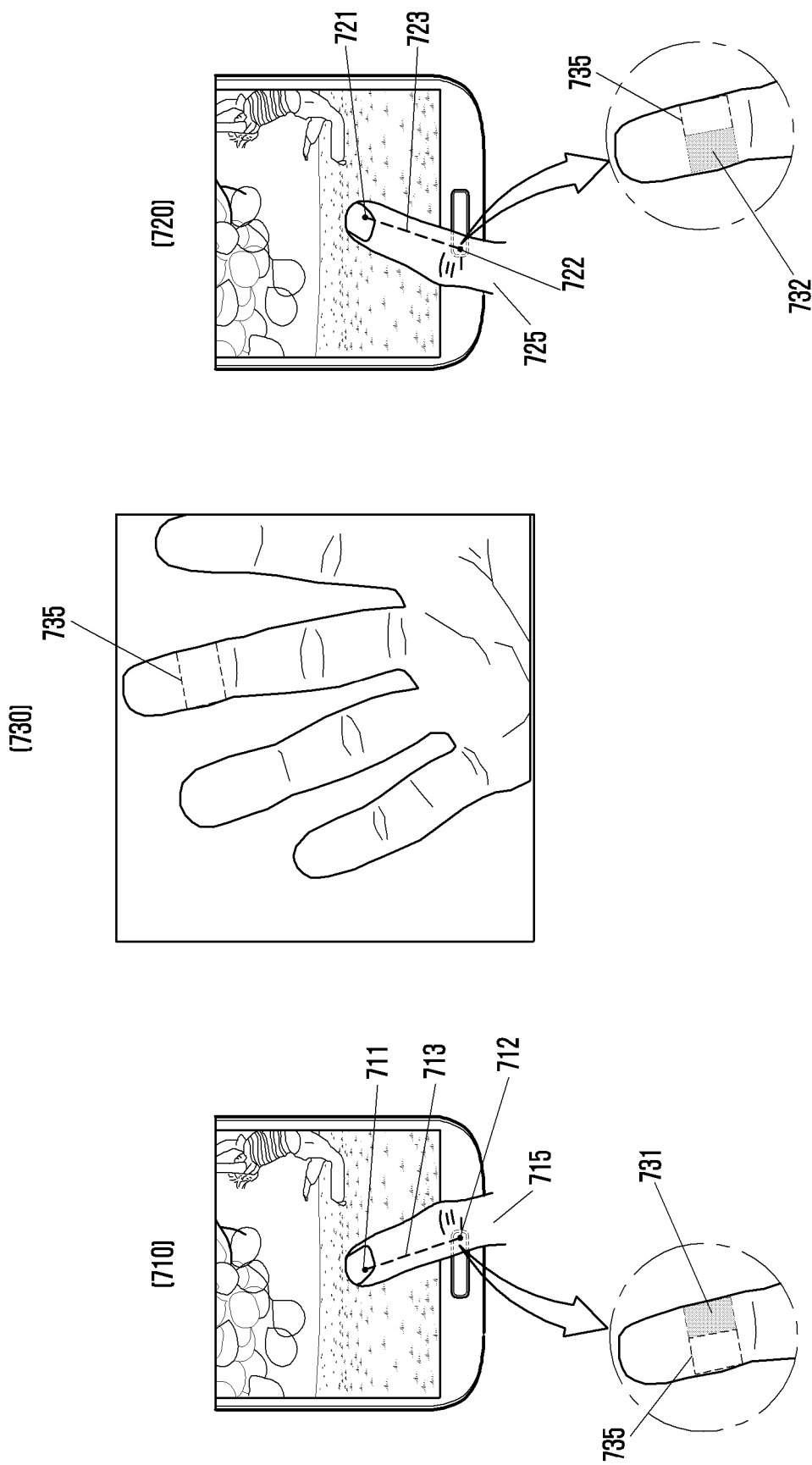
FIG. 7 illustrates positions of specific areas corresponding to a fingerprint image depending on positions of swipe gestures according to an embodiment of the present disclosure.

FIG. 7 illustrates positions of specific areas corresponding to a fingerprint image depending on positions of swipe gestures according to an embodiment of the present disclosure.

Referring to diagram 710 of FIG. 7, if a line 713 from a touch position 711 to a scanning position 712 is oriented right with respect to the center of the fingerprint identification sensor 157, the fingerprint position determining unit 250 may determine that a swipe gesture 715 is performed at the right side on the fingerprint identification sensor 157. For example, the horizontal position of the fingerprint image on the finger may be in the range of 0 mm to 10 mm to the right from the vertical center line of the finger. The position may correspond to a first area 731 of a portion 735 of the finger in diagram 730 of FIG. 7.

Referring to diagram 720 of FIG. 7, if a line 723 from a touch position 721 to a scanning position 722 is oriented left with respect to the center of the fingerprint identification sensor 157, the fingerprint position determining unit 250 may determine that a swipe gesture 725 is performed at the left side on the fingerprint identification sensor 157. For example, the horizontal position of the fingerprint image on the finger may be in the range of 0 mm to 10 mm to the left from the vertical center line of the finger. The position may correspond to a second area 732 of the portion 735 of the finger in diagram 730 of FIG. 7.

The fingerprint position determining unit 250 may determine at least one of the vertical position or the horizontal position of the area corresponding to the fingerprint image on the user's finger by using at least one of the touch position on the touch screen 210 or the scanning position on the fingerprint identification sensor 157, as described above. In the case of using both the vertical position and the horizontal position of the fingerprint image, the fingerprint position determining unit 250 may determine the accurate area corresponding to the fingerprint image on the user's finger. The fingerprint position determining unit 250 may transfer the information on the position of the area corresponding to the fingerprint image on the user's finger to the fingerprint image mapping unit 260.

By using fingerprint feature information obtained from the feature information computing unit 230 and information on the position of the area corresponding to the fingerprint image on the user's finger obtained from the fingerprint position determining unit 250, the fingerprint image mapping unit 260 may perform the mapping of feature information of the fingerprint images obtained according to each area of the user's finger, or store and retrieve the mapped results of the feature information to and from the memory 140. For example, in the case of registering the fingerprint image of the user, the fingerprint image mapping unit 260 may perform the mapping of the feature information with respect to the user's finger by using the feature information of the fingerprint image and the information on the position of the area corresponding to the fingerprint image, and store the mapped results. For another example, in the case of the user authentication by using the fingerprint image, the fingerprint image mapping unit 260 may retrieve the pre-registered feature information of the fingerprint image related to the area corresponding to the obtained fingerprint image from the memory 140.

Figure 8:
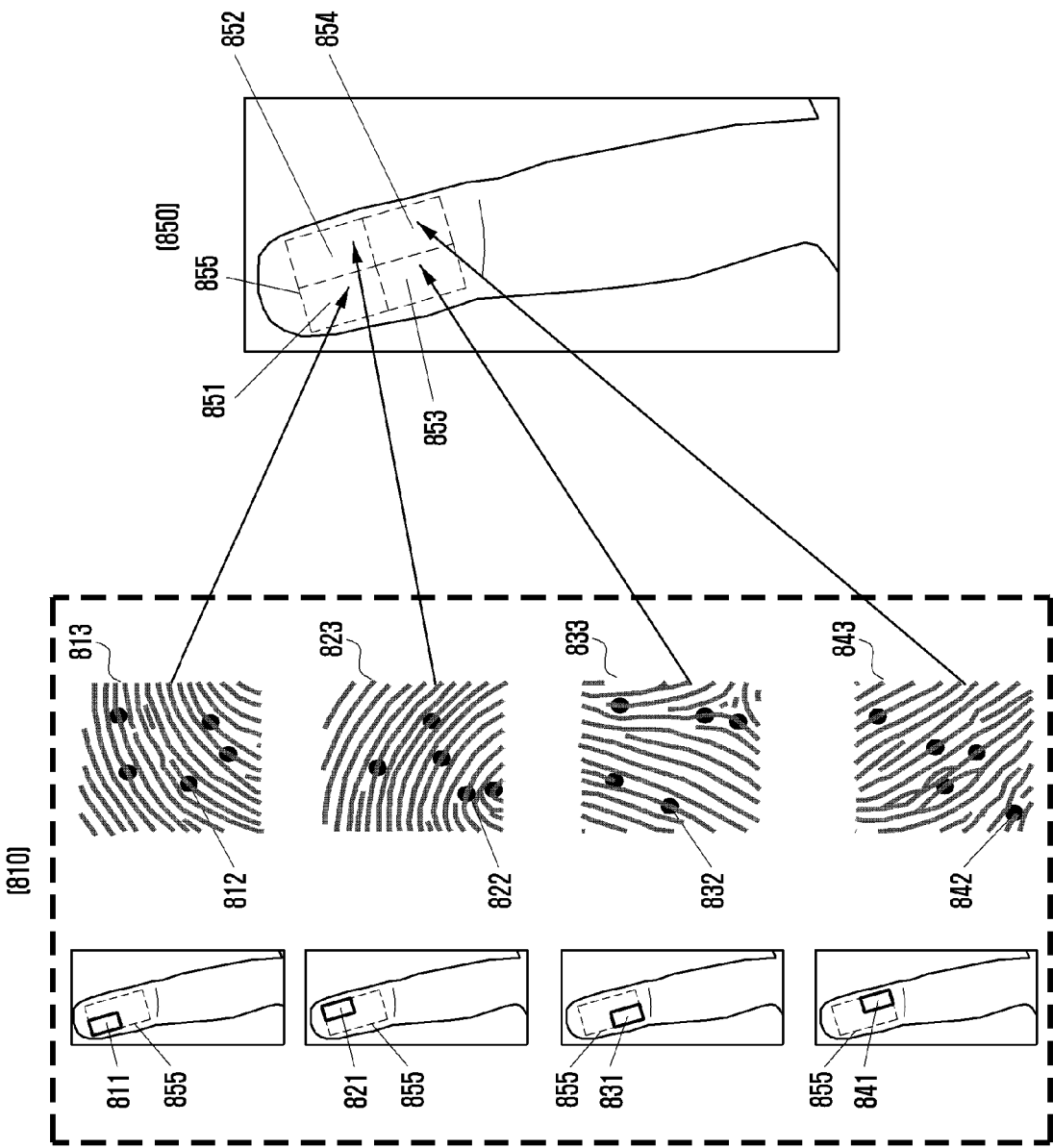
FIG. 8 illustrates a method of mapping fingerprint images with a finger according to an embodiment of the present disclosure.

FIG. 8 illustrates a method of mapping fingerprint images with respect to a finger according to an embodiment of the present disclosure.

Referring to FIG. 8, the fingerprint image pairing unit 260 may obtain feature information 812, 822, 832 and 842 of each of the fingerprint images corresponding to areas 811, 821, 831 and 841 of user's finger, respectively. In addition, the fingerprint image pairing unit 260 may perform the mapping of the feature information of the obtained fingerprint image with respect to a portion 855 of the user's finger. For example, the feature information 812 of a fingerprint image 813 corresponding to the area 811 of the fingerprint image in diagram 810 of FIG. 8 may be mapped as the feature information of the fingerprint image corresponding to a first area 851 in diagram 850 of FIG. 8. In addition, the feature information 822 of a fingerprint image 823 corresponding to the area 821 of the fingerprint image in diagram 810 of FIG. 8 may be mapped as the feature information of the fingerprint image corresponding to a second area 852 in diagram 850 of FIG. 8. Further, the feature information 832 of a fingerprint image 833 corresponding to the area 831 of the fingerprint image in diagram 810 of FIG. 8 may be mapped as the feature information of the fingerprint image corresponding to a third area 853 in diagram 850 of FIG. 8. Furthermore, the feature information 842 of a fingerprint image 843 corresponding to the area 841 of the fingerprint image in diagram 810 of FIG. 8 may be mapped as the feature information of the fingerprint image corresponding to a fourth area 854 in diagram 850 of FIG. 8. At this time, if the first area 851 to the fourth area 854 overlap each other, the feature information of the fingerprint image corresponding to the overlapped area may be mapped with the feature information that has high quality, has more pieces of information, or has the latest information, among the feature information of the first area 851 to the fourth area 854.

The fingerprint image mapping unit 260 may obtain the feature information of the fingerprint image with respect to the portion 855 of the finger by mapping the feature information on each area of the fingerprint image, and adjusting the overlapped area. The feature information on each area of the user's finger may be stored in the memory 140 in the form of an image, an array, or a link. For example, the portion 855 of the finger may be coordinated as an X-axis and a Y-axis, and the feature information corresponding to specific sections of the X-axis and the Y-axis may be stored in the memory 140. Alternatively, the image in which the portion 855 of the finger is mapped with the feature information may be stored in the memory 140.

In the case of the user authentication, the fingerprint image mapping unit 260 may obtain the pre-stored feature information of the area corresponding to the obtained fingerprint image from the memory 140. For example, the fingerprint image mapping unit 260 may obtain the information on the position of the area corresponding to the fingerprint image obtained from the fingerprint position determining unit 250. Thereafter, by using the position information, the fingerprint image mapping unit 260 may retrieve feature information of the area corresponding to the obtained fingerprint image, among the feature information mapped with respect to the portion of the finger, which is pre-registered in the memory 140. In addition, the fingerprint image mapping unit 260 may transfer the retrieved feature information to the feature information comparing unit 270.

The feature information comparing unit 270 may compare the feature information of the fingerprint image obtained from the fingerprint identification sensor 157 with the feature information of the area corresponding to the fingerprint image, which is pre-registered in the memory 140 for the user authentication. In addition, the feature information comparing unit 270 may calculate a match score showing matching information between the feature information, as a result of the comparison. For example, the match score may be calculated based on the number of feature points which match each other or the value of degree of correspondence there between, among the feature points included in the obtained feature information and the pre-registered feature information. For example, the match score may be calculated according to statistic data or a probability function, by considering similarity of the distances, the directions or the arrangement between the feature points included in the feature information and a reference point. In addition, the feature information comparing unit 270 may compare the calculated match score value with a specific critical value, and if the match score value is equal to or more than the critical value, determine the success of the user authentication. Here, the critical value may be determined by a manufacturer of the electronic device 100, or a supplier of the applications or the operating system installed in the electronic device 100. In addition, the critical value may be designated according to the security level configured through a user interface. In the case of the success of the user authentication, the feature information comparing unit 270 may provide the result to a function executing unit (not shown). The function executing unit (not shown) may receive the result of the user authentication from the feature information comparing unit 270, and execute at least one function provided by the electronic device 100.

Figure 9:
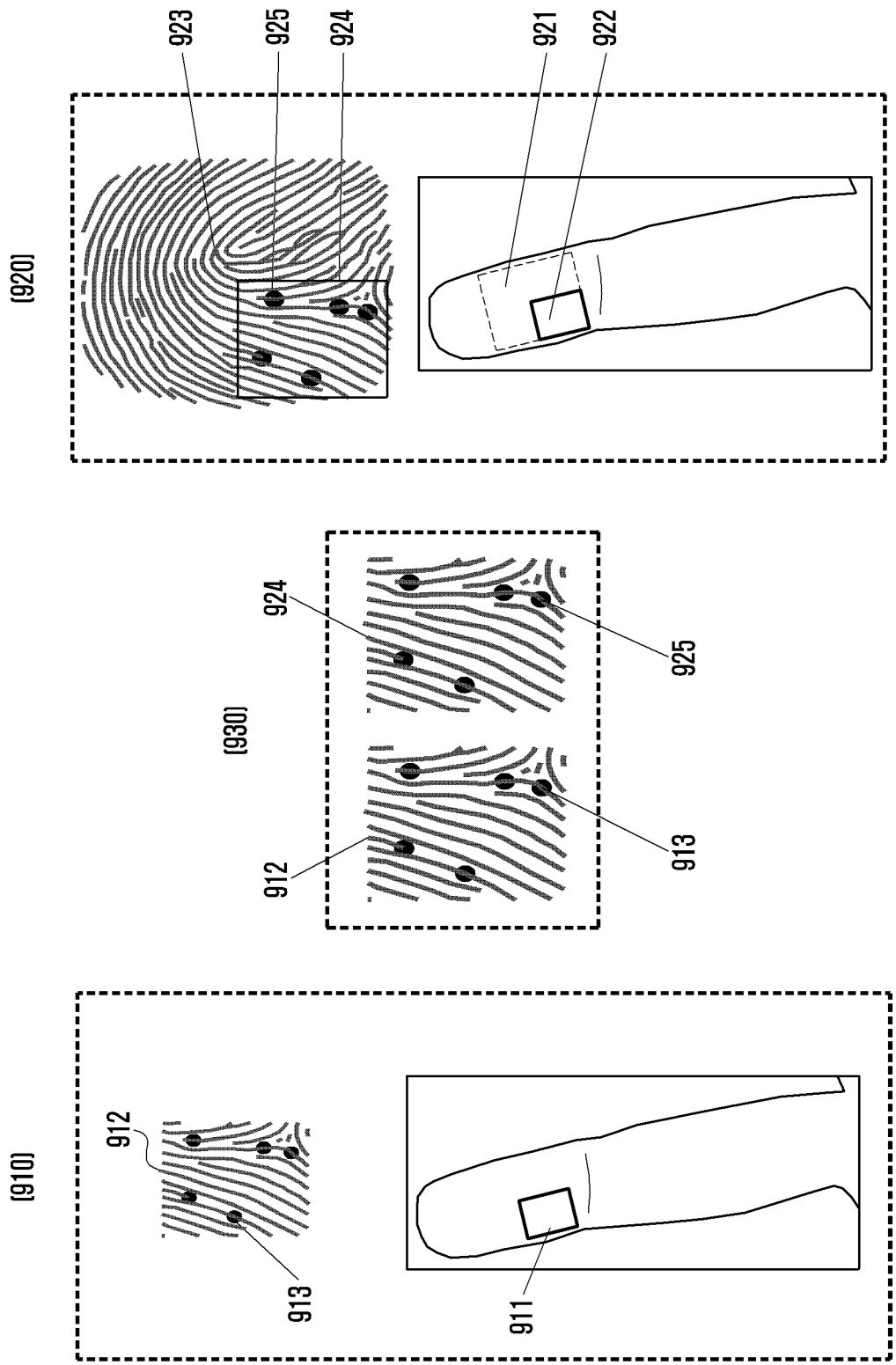
FIG. 9 illustrates a method of comparing fingerprint images with each other according to an embodiment of the present disclosure.

FIG. 9 illustrates a method of comparing fingerprint images with each other according to an embodiment of the present disclosure.

Referring to diagram 910 of FIG. 9, the feature information comparing unit 270 may obtain feature information 913 of a fingerprint image 912 corresponding to an area 911 of the user's finger, which is obtained from the fingerprint identification sensor 157 for the user authentication. In addition, referring to diagram 920 of FIG. 9, if a pre-registered fingerprint image 923 or feature information of the fingerprint image 923 corresponding to a portion 921 of the user's finger is stored in the memory 140, the feature information comparing unit 270 may obtain feature information 925 of a fingerprint image 924 corresponding to an area 922 of which position is the same as or similar to that of the area 911.

Referring to diagram 930 of FIG. 9, the feature information comparing unit 270 the feature information 913 of the fingerprint image 912 obtained in diagram 910 of FIG. 9 with the feature information 925 of the pre-registered fingerprint image 912 in diagram 920 of FIG. 9. If the match score value between the obtained feature information 913 and the pre-registered feature information 925 is equal to or more than a specific critical value, the feature information comparing unit 270 may determine the success of the user authentication. On the contrary, the match score value is less than the critical value, the feature information comparing unit 270 may determine the failure of the user authentication.

Figure 10:
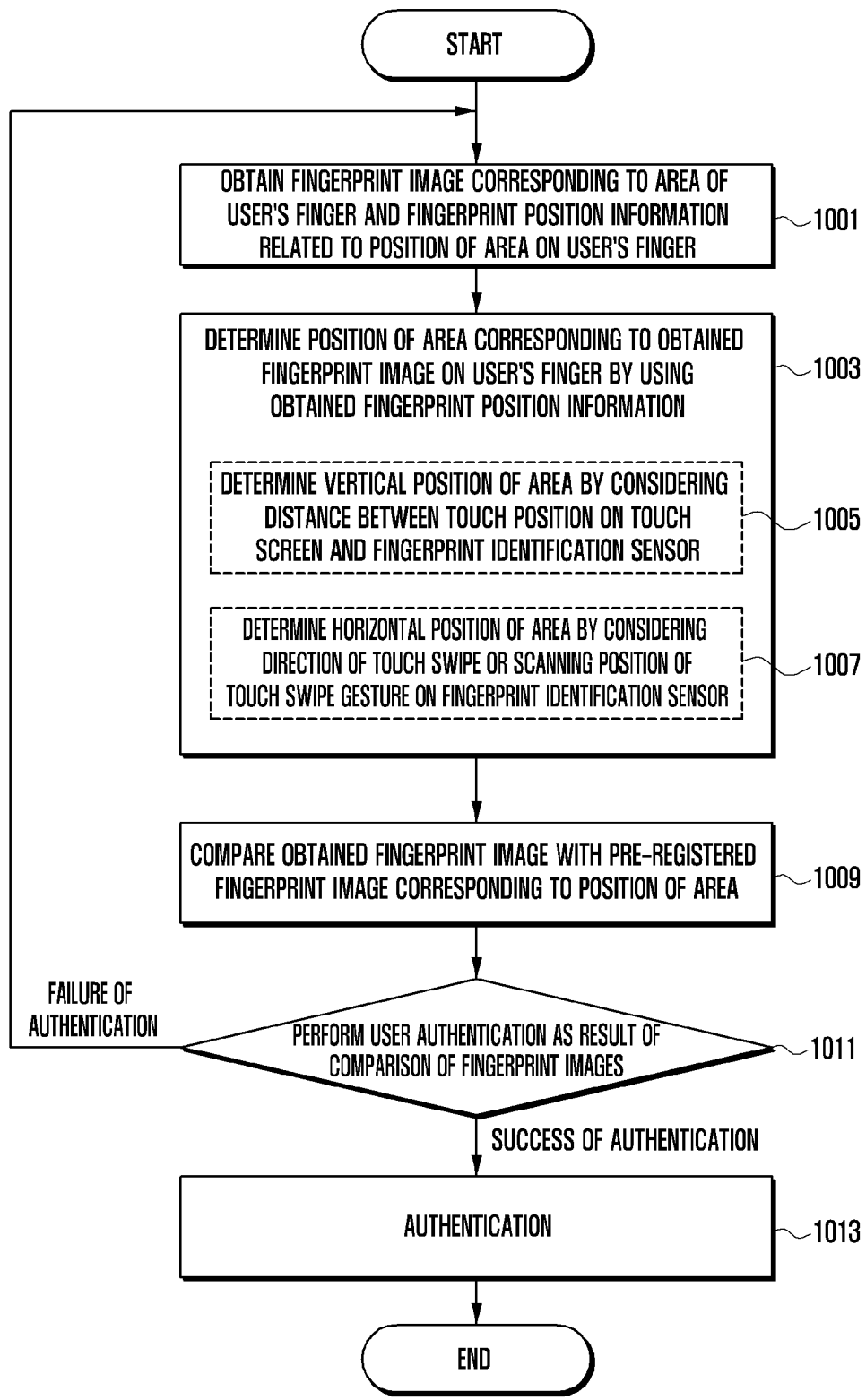
FIG. 10 is a flowchart illustrating a method for performing user authentication by using a user's fingerprint according to an embodiment of the present disclosure.

FIG. 10 is a flowchart illustrating a method for performing user authentication by using a user's fingerprint according to an embodiment of the present disclosure.

Referring to FIG. 10, the electronic device 100 may receive an input of the swipe gesture on the touch screen 210 and the fingerprint identification sensor 157. At this time, the swipe gesture may be performed in the direction from the touch screen 210 to the fingerprint identification sensor 157. With the swipe gesture, the electronic device 100 may obtain fingerprint position information from the touch screen 210 and fingerprint image from the fingerprint identification sensor 157, respectively at operation 1001.

Thereafter, the electronic device 100 may determine the position of an area corresponding to the obtained fingerprint image on the user's finger by using the obtained fingerprint position information at operation 1003. At this time, the electronic device 100 may determine the vertical position of the specific area by considering the distance between the touch position due to the swipe gesture on the touch screen 210 and the fingerprint identification sensor 157 at operation 1005.

Alternatively, the electronic device 100 may determine the horizontal position of the specific area by considering the direction of the swipe gesture on the touch screen 210 or the scanning position of the swipe gesture on the fingerprint identification sensor 157 at operation 1007.

Thereafter, the electronic device 100 may compare the obtained fingerprint image with the pre-registered fingerprint image at operation 1009. For example, the electronic device 100 may compare the feature information of the obtained fingerprint image with the feature information of the pre-registered fingerprint image. Thereafter, as a result of the comparison, the electronic device 100 may perform the user authentication at operation 1011. In the case of the success of the user authentication, the electronic device 100 may perform at least one function at operation 1013. At this time, the at least one function may be, for example, releasing the locked state of the screen of the electronic device 100, executing a locked application, or executing a locked function of the application. On the contrary, in the case of the failure of the user authentication, the electronic device 100 may maintain the locked state. Alternatively, the electronic device 100 may provide guide information to request the release of the locked state through the display unit 110.

Figure 11:
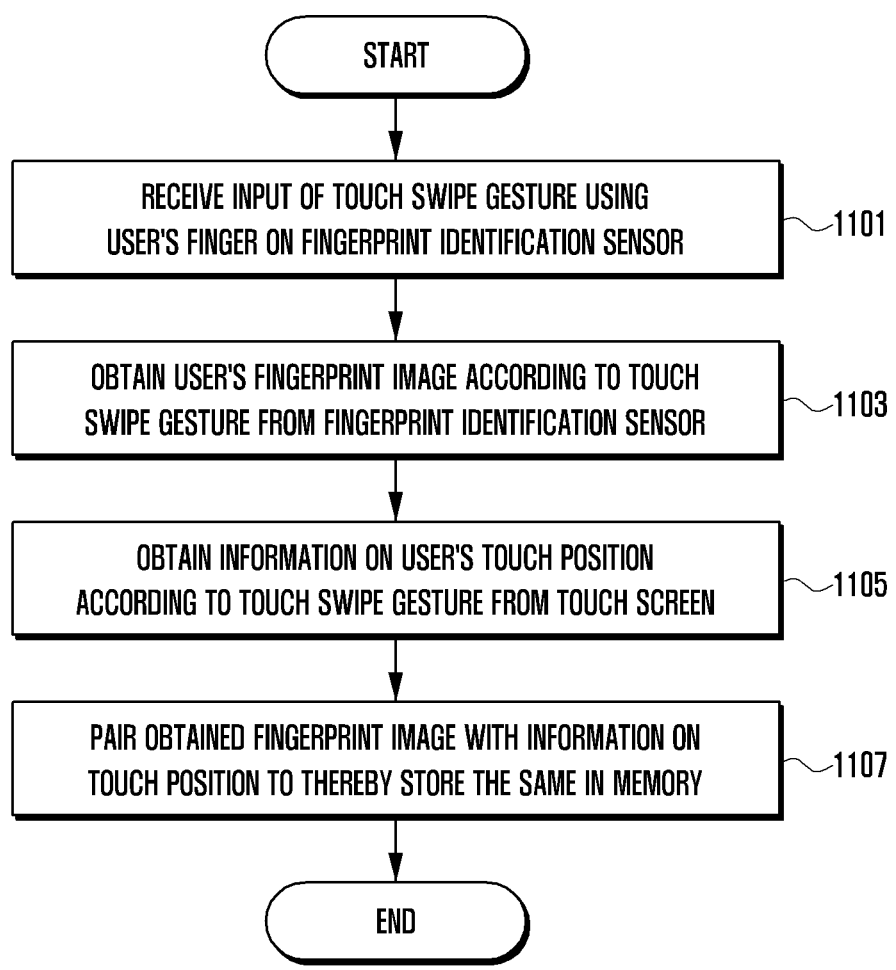
FIG. 11 is a flowchart illustrating a method for registering a user's fingerprint according to an embodiment of the present disclosure.

FIG. 11 is a flowchart illustrating a method for registering a user's fingerprint according to an embodiment of the present disclosure.

Referring to FIG. 11, the electronic device 100 may receive an input of the swipe gesture on the touch screen 210 and the fingerprint identification sensor 157 at operation 1101. Thereafter, the electronic device 100 may obtain fingerprint image of the user due to the swipe gesture from the fingerprint identification sensor 157 at operation 1103. Thereafter, the electronic device 100 may obtain fingerprint position information due to the swipe gesture from the touch screen 210 at operation 1105. At this time, the operation 1103 and the operation 1105 may be performed in reverse order, or simultaneously. Thereafter, the electronic device 100 may pair the obtained fingerprint image with the fingerprint position information, and then store the same in the memory 140 at operation 1107. For example, by using the fingerprint position information, the electronic device 100 may determine the position of an area corresponding to the obtained fingerprint image on the user's finger, and pair the obtained fingerprint image with the determined position of the area, to thereby store the same in the memory.

It may be understood that various embodiments of the present disclosure can be implemented in software, hardware, or a combination thereof. Such a software may be stored, for example, in a volatile or non-volatile storage device, such as a ROM, and the like, a memory, such as a RAM, a memory chip, a memory device, or a memory IC, or an optical or magnetic recordable and a machine (e.g. a computer)-readable medium, such as a Compact Disk (CD), a Digital Versatile Disc (DVD), a magnetic disk, or a magnetic tape, regardless of its ability to be erased or its ability to be rerecorded.

It can also be noted that the method for performing user authentication or registration by using a fingerprint in an electronic device and the electronic device using the same according to the present disclosure may be implemented by a computer or an electronic device including a controller and a memory, and the memory is an example of a machine-readable storage medium suitable for storing a program or programs including instructions that implement various embodiments of the present disclosure. Accordingly, the present disclosure includes a program including a code for implementing the apparatus or the method defined in the appended claims of the present specification and a machine (computer, and the like) readable storage medium for storing the program. Moreover, such a program may be electronically transferred through a specific medium, such as a communication signal transferred through a wired or wireless connection, and the present disclosure properly includes the equivalents thereof. Further, the electronic device using the method for performing user authentication or registration by using a fingerprint in an electronic device according to the present disclosure may receive the program from a program providing device wired or wirelessly connected thereto and store the received program. Furthermore, a user of the electronic device may selectively limit an operation according to an embodiment of the present disclosure within a user equipment or expand the operation to be linked with a server through a network by adjusting the settings of the electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing user authentication by using a fingerprint in an electronic device adopting a touch screen and a fingerprint identification sensor, the method comprising:
   receiving an input of a swipe gesture on the touch screen and the fingerprint identification sensor;
   obtaining fingerprint position information from the touch screen and fingerprint image from the fingerprint identification sensor, respectively, according to the swipe gesture;
   determining the position of an area corresponding to the obtained fingerprint image on the user's finger, by using the fingerprint position information;
   comparing the obtained fingerprint image with a pre-registered fingerprint image corresponding to the position of the area; and
   performing the user authentication according to the result of the comparison of the pre-registered fingerprint image and the obtained fingerprint image.

2. The method of claim 1, wherein the fingerprint position information is related to a touch position or a hovering position of the swipe gesture on the touch screen, and wherein the swipe gesture proceeds in the direction from the touch screen to the fingerprint identification sensor.

3. The method of claim 1, wherein the determining of the position of an area corresponding to the obtained fingerprint image on the user's finger by using the obtained fingerprint position information comprises determining a vertical position of the area corresponding to the fingerprint image on the user's finger, by considering a distance between a touch position or a hovering position of the swipe gesture on the touch screen and the fingerprint identification sensor.

4. The method of claim 1, wherein the determining of the position of an area corresponding to the obtained fingerprint image on the user's finger by using the obtained fingerprint position information comprises determining that the shorter the distance between a touch position or a hovering position of the swipe gesture on the touch screen and the fingerprint identification sensor is, the closer to the tip of the finger the position of an area corresponding to the obtained fingerprint image on the user's finger is.

5. The method of claim 1, wherein the determining of the position of an area corresponding to the obtained fingerprint image on the user's finger by using the fingerprint position information comprises determining the position of an area corresponding to the obtained fingerprint image on the user's finger, by considering a direction of the swipe gesture on the touch screen or a scanning position of the swipe gesture on the fingerprint identification sensor.

6. The method of claim 1, wherein the comparing of the obtained fingerprint image with a pre-registered fingerprint image comprises comparing feature information of the obtained fingerprint image with pre-registered feature information of the fingerprint image.

7. The method of claim 6, further comprising:
calculating a match score showing matching information between the feature information, as a result of the comparison.

8. The method of claim 7, further comprising:
comparing the calculated match score value with a specific critical value; and
if the match score value is equal to or more than the critical value, determining the success of the user authentication,
wherein the critical value is at least one of a registered value and a value designated according to a security level configured through a user interface of the electronic device.

9. The method of claim 1, wherein the fingerprint identification sensor is physically combined with a home button of the electronic device, and one side of the fingerprint identification sensor, which is to be contacted with a user's finger to perform the swipe gesture, is exposed on the home button of the electronic device.

10. A method for registering a user's fingerprint in an electronic device adopting a touch screen and a fingerprint identification sensor, the method comprising:
receiving an input of a swipe gesture on the touch screen and the fingerprint identification sensor;
obtaining fingerprint position information from the touch screen and fingerprint image from the fingerprint identification sensor, respectively, according to the swipe gesture; and
pairing the obtained fingerprint image with the fingerprint position information to thereby store the same in a memory,
wherein the pairing of the obtained fingerprint image and the fingerprint position information to thereby store the same in a memory comprises:
determining the position of an area corresponding to the obtained fingerprint image on a user's finger, by using the fingerprint position information; and
pairing the obtained fingerprint image with the determined position of the area to thereby store the same in the memory.

11. An electronic device comprising:
a touch screen;
a fingerprint identification sensor configured to receive an input of a swipe gesture;
a memory configured to store a pre-registered fingerprint image; and
a processor configured to:
obtain fingerprint position information from the touch screen and fingerprint image from the fingerprint identification sensor, respectively, according to the swipe gesture,
determine the position of an area corresponding to the obtained fingerprint image on the user's finger by using the fingerprint position information,
compare the obtained fingerprint image with the pre-registered fingerprint image corresponding to the position of the area, and
perform user authentication according to the result of the comparison of the pre-registered fingerprint image and the obtained fingerprint image.

12. The electronic device of claim 11, wherein the fingerprint position information is related to a touch position or a hovering position of the swipe gesture on the touch screen, and wherein the swipe gesture proceeds in the direction from the touch screen to the fingerprint identification sensor.

13. The electronic device of claim 11, wherein the processor, in determining the position of the area corresponding to the obtained fingerprint image on the user's finger by using the obtained fingerprint position information, is further configured to determine a vertical position of the area corresponding to the fingerprint image on the user's finger, by considering a distance between a touch position or a hovering position of the swipe gesture on the touch screen and the fingerprint identification sensor.

14. The electronic device of claim 11, wherein the processor, in determining the position of the area corresponding to the obtained fingerprint image on the user's finger by using the obtained fingerprint position information, is further configured to determine that the shorter the distance between a touch position or a hovering position of the swipe gesture on the touch screen and the fingerprint identification sensor is, the closer to the tip of the finger the position of an area corresponding to the obtained fingerprint image on the user's finger is.

15. The electronic device of claim 11, wherein the processor, in determining the position of an area corresponding to the obtained fingerprint image on the user's finger by using the fingerprint position information, is further configured to determine the position of an area corresponding to the obtained fingerprint image on the user's finger, by considering a direction of the swipe gesture on the touch screen or a scanning position of the swipe gesture on the fingerprint identification sensor.

16. The electronic device of claim 11, wherein the processor, in comparing the obtained fingerprint image with a pre-registered fingerprint image, is further configured to compare feature information of the obtained fingerprint image with pre-registered feature information of the fingerprint image.

17. The electronic device of claim 16, wherein the processor is further configured to calculate a match score showing matching information between the feature information, as a result of the comparison.

18. The electronic device of claim 17, wherein the processor is further configured to compare the calculated match score value with a specific critical value, and, if the match score value is equal to or more than the critical value, to determine the success of the user authentication, wherein the critical value is at least one of a registered value and a value designated according to a security level configured through a user interface of the electronic device.

19. The electronic device of claim 11, wherein the fingerprint identification sensor is physically combined with a home button of the electronic device, and one side of the fingerprint identification sensor, which is to be contacted with a user's finger to perform the swipe gesture, is exposed on the home button of the electronic device.

20. An electronic device comprising:
a touch screen;
a fingerprint identification sensor configured to receive an input of a swipe gesture;
a memory configured to store a fingerprint image; and a processor configured to:
- obtain fingerprint position information from the touch screen and fingerprint image from the fingerprint identification sensor, respectively, according to the swipe gesture,
- pair the obtained fingerprint image with the fingerprint position information, to thereby store the same in the memory,
- determine the position of an area corresponding to the obtained fingerprint image on a user's finger, by using the fingerprint position information, and
- pair the obtained fingerprint image with the determined position of the area to thereby store the same in the memory.

21. A non-transitory recording medium that records a program for executing a method for performing user authentication by using a fingerprint, the method comprising:
- receiving an input of a swipe gesture on the touch screen and the fingerprint identification sensor;
- obtaining fingerprint position information from the touch screen and fingerprint image from the fingerprint identification sensor, respectively, according to the swipe gesture;
- determining the position of an area corresponding to the obtained fingerprint image on the user's finger, by using the fingerprint position information;
- comparing the obtained fingerprint image with a pre-registered fingerprint image corresponding to the position of the area; and
- performing the user authentication according to the result of the comparison of the pre-registered fingerprint image and the obtained fingerprint image.

22. A non-transitory recording medium that records a program for executing a method for registering a user's fingerprint, the method comprising:
- receiving an input of a swipe gesture on the touch screen and the fingerprint identification sensor;
- obtaining fingerprint position information from the touch screen and fingerprint image from the fingerprint identification sensor, respectively, according to the swipe gesture; and
- pairing the obtained fingerprint image with the fingerprint position information to thereby store the same in a memory,
- wherein pairing of the obtained fingerprint image and the fingerprint position information to thereby store the same in a memory comprises:
  - determining the position of an area corresponding to the obtained fingerprint image on a user's finger, by using the fingerprint position information; and
  - pairing the obtained fingerprint image with the determined position of the area to thereby store the same in the memory.

* * * * *